US 7,103,427 B2

(12) United States Patent
Dillon (10) Patent No.: US 7,103,427 B2
(45) Date of Patent: Sep. 5, 2006

(54) DELIVERY OF PROCESS PLANT NOTIFICATIONS (75) Inventor: Steven R. Dillon, White Bear Lake, MN (US)

(73) Assignee: Fisher-Rosemont Systems, Inc., Austin, TX (US)

( * ) Notice: Subject to any disclaimer, the term of this patent is extended or adjusted under 35 U.S.C. 154(b) by 157 days.

(21) Appl. No.: 10/376,550

(22) Filed: Feb. 28, 2003

(65) Prior Publication Data
US 2004/0172147 A1 Sep. 2, 2004

(51) Int. Cl.
*G05B 15/00* (2006.01)
(52) U.S. Cl. .......................... 700/83; 345/440; 714/37
(58) Field of Classification Search ................ 700/83; 371/53; 707/101; 345/440; 714/37
See application file for complete search history.

(56) References Cited

U.S. PATENT DOCUMENTS

| | | | |
|---|---|---|---|
| 4,527,271 A | 7/1985 | Hallee et al. | |
| 4,607,325 A | 8/1986 | Horn | |
| 4,657,179 A | 4/1987 | Aggers et al. | |
| 4,734,873 A | 3/1988 | Malloy et al. | |
| 4,763,243 A | 8/1988 | Barlow et al. | |
| 4,764,862 A | 8/1988 | Barlow et al. | |
| 4,853,175 A | 8/1989 | Book, Sr. | |
| 4,885,694 A | 12/1989 | Pray et al. | |
| 4,907,167 A | 3/1990 | Skeirik | |
| 4,910,691 A | 3/1990 | Skeirik | |
| 4,944,035 A | 7/1990 | Aagardl et al. | |
| 4,956,793 A | 9/1990 | Bonne et al. | |
| 4,965,742 A | 10/1990 | Skeirik | |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,863 A | 8/1991 | Bristol et al. | |
| 5,050,095 A | 9/1991 | Samad | |
| 5,070,458 A | 12/1991 | Gilmore et al. | |
| 5,121,467 A | 6/1992 | Skeirik | |
| 5,134,574 A | 7/1992 | Beaverstock et al. | |
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,189,232 A | 2/1993 | Shabtai et al. | |
| 5,193,143 A | 3/1993 | Kaemmerer et al. | |
| 5,197,114 A | 3/1993 | Skeirik | |

(Continued)

FOREIGN PATENT DOCUMENTS

DE     199 62 230 A1    6/2001

(Continued)

OTHER PUBLICATIONS

Samata Kodolikar, Preparedness Planning for State Health Officials, 2003, ASTHO.*

(Continued)

*Primary Examiner*—Anthony Knight
*Assistant Examiner*—Sunray Chang
(74) *Attorney, Agent, or Firm*—Marshall, Gerstein & Borun LLP (57) ABSTRACT

In a method for configuring delivery of notifications related to process plants, at least one person is selected to receive a notification from a process entity in a process plant. Additionally, a delivery method for delivering the notification to the at least one person is selected. The selected person and the selected delivery method may be stored in a memory.

22 Claims, 5 Drawing Sheets

U.S. PATENT DOCUMENTS

| | | | |
|---|---|---|---|
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,311,562 A | 5/1994 | Palosamy et al. |
| 5,325,522 A | 6/1994 | Vaughn |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,461,570 A | 10/1995 | Wang et al. |
| 5,486,920 A | 1/1996 | Killpatrick et al. |
| 5,486,996 A | 1/1996 | Samad et al. |
| 5,488,697 A | 1/1996 | Kaemmerer et al. |
| 5,499,188 A | 3/1996 | Kline, Jr. et al. |
| 5,521,842 A | 5/1996 | Yamoda |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,640,493 A | 6/1997 | Skeirik |
| 5,666,297 A | 9/1997 | Britt et al. |
| 5,680,409 A | 10/1997 | Qin et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,790,898 A | 8/1998 | Kishima et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,859,964 A | 1/1999 | Wang et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,917,840 A * | 6/1999 | Cheney et al. ............... 714/807 |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 6,008,985 A | 12/1999 | Lake et al. |
| 6,017,143 A | 1/2000 | Eryurek et al. |
| 6,026,352 A | 2/2000 | Burns et al. |
| 6,033,257 A | 3/2000 | Lake et al. |
| 6,041,263 A | 3/2000 | Boston et al. |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Havlena et al. |
| 6,108,616 A | 8/2000 | Borchers et al. |
| 6,110,214 A | 8/2000 | Klimasaukas |
| 6,122,555 A | 9/2000 | Lu |
| 6,128,279 A | 10/2000 | O'Neil et al. |
| 6,144,952 A | 11/2000 | Keeler et al. |
| 6,169,980 B1 | 1/2001 | Keeler et al. |
| 6,266,726 B1 | 7/2001 | Nixon et al. |
| 6,298,377 B1 | 10/2001 | Hartikainen et al. |
| 6,298,454 B1 * | 10/2001 | Schleiss et al. ............... 714/37 |
| 6,317,701 B1 | 11/2001 | Pyötsia et al. |
| 6,332,110 B1 | 12/2001 | Wolfe |
| 6,397,114 B1 | 5/2002 | Eryurek et al. |
| 6,421,571 B1 | 7/2002 | Spriggs et al. |
| 6,445,963 B1 | 9/2002 | Blevins et al. |
| 6,529,780 B1 * | 3/2003 | Soergel et al. ............... 700/10 |
| 6,766,328 B1 * | 7/2004 | Stefanchik et al. .......... 707/101 |
| 6,856,315 B1 * | 2/2005 | Eberlein ..................... 345/440 |
| 2002/0022894 A1 | 2/2002 | Eryurek et al. |
| 2002/0077711 A1 | 6/2002 | Nixon et al. |
| 2002/0147511 A1 | 10/2002 | Eryurek et al. |
| 2002/0161940 A1 | 10/2002 | Eryurek et al. |
| 2002/0163427 A1 | 11/2002 | Eryurek et al. |
| 2003/0014500 A1 | 1/2003 | Schleiss et al. |

FOREIGN PATENT DOCUMENTS

| | | |
|---|---|---|
| EP | 0 612 039 A3 | 8/1994 |
| EP | 0 626 697 A1 | 11/1994 |
| EP | 0 961 184 A2 | 12/1999 |
| EP | 0 964 325 A1 | 12/1999 |
| EP | 0 965 897 A1 | 12/1999 |
| EP | 1 284 326 A1 | 2/2003 |
| GB | 2 294 129 A | 4/1996 |
| GB | 2 294 793 A | 5/1996 |
| GB | 2 347 234 A | 8/2000 |
| GB | 2 357 389 | 6/2001 |

OTHER PUBLICATIONS

Wernwe Kalkhoff, "Agent-Oriented Robot Task Transformation", Proceedings of the International Symposium on Intelligent Control, IEEE, pp. 242-247 (Aug. 27, 1995).

"GE PREDICTOR™ Services: GE PREDICTOR Services Overview," GE Industrial Systems, available at http://www.geindustrial.com/cwc/services?id=71 on Jul. 18, 2002.

"Electrical Equipment Coverage," GE Industrial Systems, available at http://www.geindustrial.com/cwc/services?id=72 on Jul. 18, 2002.

"Customer Impact," GE Industrial Systems, available at http://www.geindustrial.com/cwc/services?id=73 on Jul. 18, 2002.

"Components of GE PREDICTOR™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

International Search Report issued in PCT/US2004/002831 mailed on Feb. 18, 2005.

Written Opinion issued in PCT/US2004/002831 mailed on Feb. 18, 2005.

* cited by examiner

DELIVERY OF PROCESS PLANT NOTIFICATIONS

FIELD OF THE DISCLOSURE

The present disclosure generally relates to process plant control and maintenance, and, more particularly, to the delivery of information related to process entities in a process plant.

DESCRIPTION OF THE RELATED ART

Process control systems have widespread application in the automation of industrial processes such as the processes used in chemical, petroleum, and manufacturing industries, for example. Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses or other communication lines to the field devices to control the operation of the process. Information from the field devices and the controllers is sometimes made available to one or more applications executed by the operator workstation to enable an operator to perform desired functions with respect to the process, such as viewing the current state of the process, modifying the operation of the process, etc. Some known controller/operator interface software is designed to generate and display process alarms resulting from process control operations performed by software in the controllers or other devices.

The DeltaV™ process control system sold by Fisher-Rosemount Systems, Inc. uses function blocks located or installed in controllers or different field devices to perform control operations. The controllers and, in some cases, the field devices are capable of storing and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-derivative-integral (PID) control routine. The different function blocks within a process control system are configured to communicate with each other (e.g., within a single device or over a bus) to form one or more process control loops, the individual operations of which can thus be spread throughout the process.

Typically, the function blocks or the devices in which these function blocks are implemented are configured to detect errors, faults or problems that occur within the process control loops or the functions being performed therein and to send a notification, such as an alarm message, to notify an operator at an operator workstation or other user interface that an undesirable condition exists within the process control system or within a control loop of the process control system. Such alarms may indicate, for example, that a function block is not communicating, has received or generated an out of range input or output, is undergoing a fault or other undesirable condition, etc. In an alarm display system described in U.S. Pat. No. 5,768,119, entitled "Process Control System Including Alarm Priority Adjustment", an application executed at, for example, an operator interface/workstation, is configured to receive messages containing process alarms related to process operation and to display these process alarms in a coherent and manageable manner to thereby enable an operator to manage alarms in some organized or logical way. U.S. Pat. No. 5,768,119 is hereby expressly incorporated by reference herein.

Known operator interface applications, such as that described in U.S. Pat. No. 5,768,119, are typically configured to enable an operator, i.e., the person overseeing the actual day-to-day operation of a process control system, to view the most critical process alarms, e.g., the alarms with the highest priority, first. Because these applications are designed with the object of providing information to a process control operator, they only display alarms associated with the functioning of the process itself. These applications are not configured to display other types of errors or alarms, such as alarms associated with malfunctioning field devices or other hardware like controllers or input/output (I/O) devices. Thus, for example, in the system described in U.S. Pat. No. 5,768,119, an operator display application displays a section of a process control system and provides an alarm banner on the bottom of the display indicating the highest priority process alarms. The displayed alarms are process alarms because they are generated by function blocks or other software used to implement a process control scheme or a process control loop and to indicate an error in the functioning of a process control loop. When an operator selects one of the process alarms at the operator workstation, the application provides the operator more information related to the selected alarm, such as the function block or module which generated the alarm, the priority of the alarm, whether the alarm has been acknowledged, etc. and may display information about the process relevant to the alarm, such as a faceplate for the loop in which the alarm occurred, a primary control display related to the portion of the plant in which the alarm occurred, etc.

In the past, conventional field devices were used in process control systems to send and receive analog (e.g., 4 to 20 milliamp) signals to and from the process controller via an analog bus or analog lines. However, these 4 to 20 milliamp signals are limited in nature in that they are indicative of process measurements made by the device or of process control signals generated by the controller required to control the operation of the device during runtime. As a result, the conventional 4–20 ma devices are incapable of generating alarms pertaining to the operational capability of the device itself. As a result, alarms associated with these devices have generally not been available within process control systems. However, in the past decade or so, smart field devices including a microprocessor and a memory have become prevalent in the process control industry. A number of standard and open smart device communication protocols such as the FOUNDATION™ Fieldbus (hereinafter "Fieldbus"), HART®, PROFIBUS®, WORLDFIP®, DeviceNet®, and CAN protocols, have been developed to enable smart field devices made by different manufacturers to be used together within the same process control network. In addition to performing a primary function within the process, smart field devices may store data pertaining to the device, communicate with the controller and/or other devices in a digital or combined digital and analog format, and perform secondary tasks such as self-calibration, identification, diagnostics, etc. Importantly, the devices conforming to at least some of these protocols are capable of detecting problems within the device itself and of generating and sending notifications (e.g., alarms or alerts) to indicate the detected problems to the appropriate operator, maintenance or engineer personnel associated with the process control system.

U.S. patent application Ser. No. 10/104,586, filed Mar. 22, 2002, and entitled "Integrated Device Alerts in a Process Control System," describes a display system for displaying alerts and alarms generated by field devices. A user interface application displays a section of a process control system and provides an alarm banner on the bottom of the display. Generally, the alarm banner indicates the highest priority device alarms that have not yet been acknowledged by an operator. When an operator selects one of the device alarms at the operator workstation, the application provides the operator more information related to the selected alarm, such as the possible conditions associated with the alarm, recommended actions to take, etc.

Using the above display systems, operators may recognize the existence of an alert or alarm and may try to fix the problem associated with the alert or alarm. For example, with a process alarm, an operator may attempt to fix a problem with software applications available to the operator. As another example, with a device alarm, maintenance personnel may attempt to fix or replace the device issuing the alarm.

In some instances, an operator may receive numerous notifications (e.g., alerts or alarms) on his or her workstation. If the number of alerts or alarms received within a short time period (e.g., a day) becomes too large, an operator may become overwhelmed and alerts or alarms may not be addressed in an optimal manner.

SUMMARY

A notification distribution system enables the delivery of notifications associated with a process plant to be configurable. For example, the notification distribution system may be configured to deliver certain notifications to specifiable persons. Additionally, the mode of delivering a notification to a person may also be specifiable.

In one aspect, a method for configuring delivery of notifications related to process plants is provided. At least one person is selected to receive a notification from a process entity in a process plant. Additionally, a delivery method for delivering the notification to the at least one person is selected. The selected person and the selected delivery method may be stored in a memory.

In another aspect, a method for delivering notifications related to process plants is provided. A notification associated with a process entity in a process plant is received. At least one destination to which to send the notification is determined based on configuration information associated with the notification. A delivery method for sending the notification to the destination is determined based on the configuration information. Then, the notification is sent to the destination according to the delivery method.

BRIEF DESCRIPTION OF THE DRAWINGS

The features and advantages of the systems described herein will be best appreciated upon reference to the following detailed description and the accompanying drawings, in which.

DETAILED DESCRIPTION

Process Plant

Figure 1:
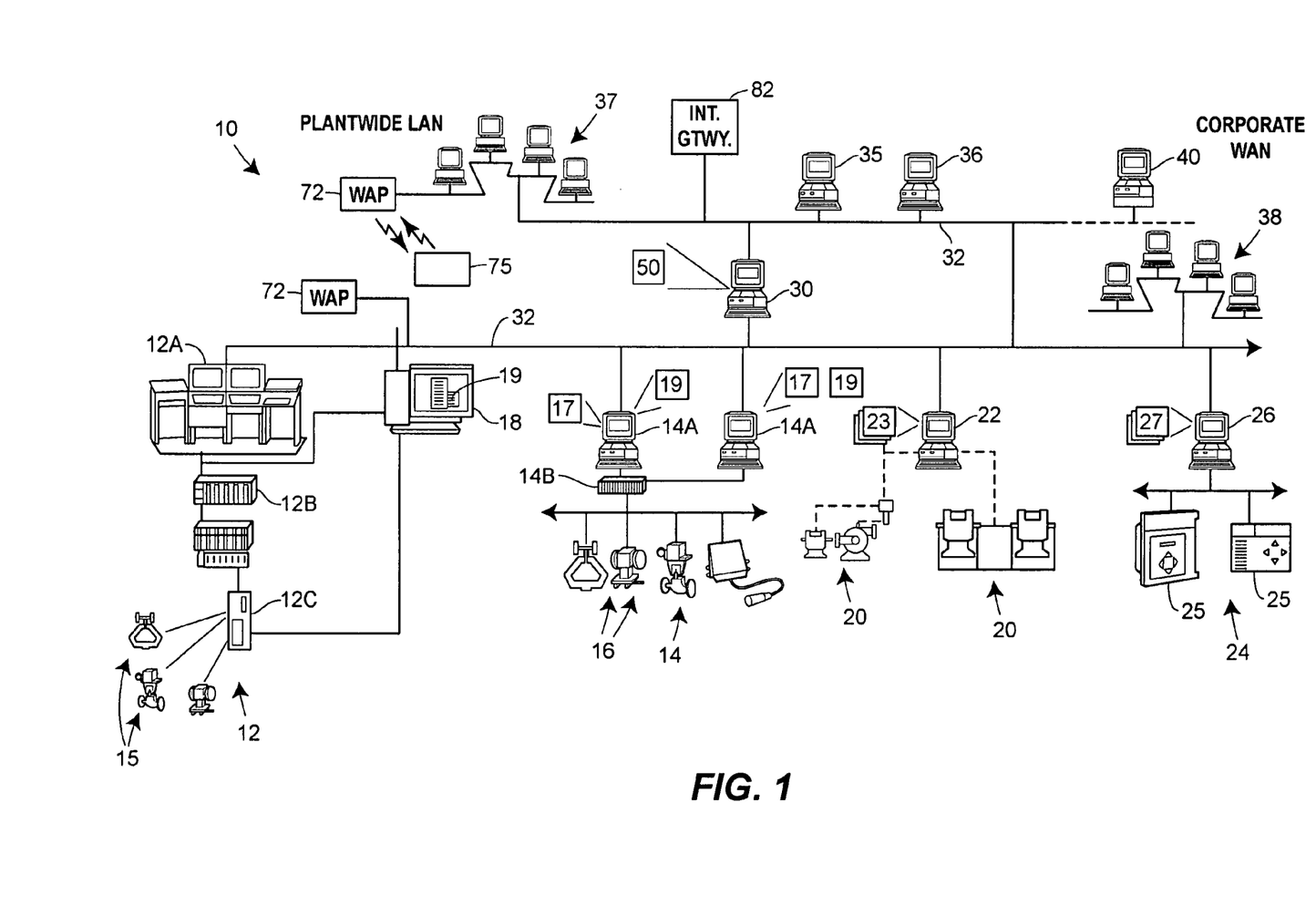
FIG. 1 is a block diagram of an example process plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or may be a DCS which includes an operator interface 12A coupled to a controller 12B and to input/output (I/O) cards 12C which, in turn, are coupled to various field devices such as analog and Highway Addressable Remote Transmitter (HART) field devices 15.

The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute applications 17 available to the process control operator for controlling the operation of the process including, for example, control optimizers, diagnostic experts, neural networks, tuners, etc. Additional control applications 17 may be stored in and executed by the controllers 12B and 14B if so desired and, in some cases, within field devices 16.

The process plant 10 may include one or more computer systems 18 that implement applications that help monitor and maintain devices (e.g., process control devices, instrumentation devices, or other types of devices) within the process plant 10. For example, the Asset Management Solutions (AMS) application available from Fisher-Rosemount Systems, Inc. enables communication with and stores data pertaining to various devices within a process plant. The computer system 18 may execute the AMS application or any other device monitoring and communication applications 19, and may be connected to the process control systems 12 and 14 or to the individual devices therein to perform maintenance and monitoring activities. For example, a computer system 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications 19 such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI Systems or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. In many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 van any communication line or may be connected only temporarily.

A computer system 30 is communicatively connected to the computers or interfaces associated with the various functional systems within the plant 10, including the process control functions 12 and 14, the maintenance functions such as those implemented in the computers 18, 14A, 22 and 26 and the business functions. If desired, this communication interconnection may be implemented using a web interface or communication structure of any kind, including any local area network (LAN), wide area network (WAN), the internet, etc. In any event, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a communication network 32 which may use any desired or appropriate LAN or WAN protocol to provide communications. This communication network or connection may be permanent or temporary (intermittent) as desired.

As illustrated in FIG. 1, the computer 30 is also connected via the same or a different communication network 32 to business system computers and maintenance planning computers 35 and 36, which may execute, for example, enterprise resource planning (ERP), material resource planning (MRP), accounting, production and customer ordering systems, maintenance planning systems or any other desired business applications such as parts, supplies and raw materials ordering applications, production scheduling applications, etc. The computer 30 may also be connected via, for example, the communication network 32, to a plantwide LAN 37, a corporate WAN 38 as well as to a computer system 40 that enables remote monitoring of or communication with the plant 10 from remote locations. The computer system 30, or any other computer connected to the communication network 32 may include a configuration application and a configuration database that generates and stores configuration data pertaining to the configuration of the process plant 10 and the devices and elements within the process plant 10.

In one embodiment, the communications over the communication network 32 occur using the XML protocol. Here, data from each of the computers 12A, 18, 14A, 22, 26, 35, 36, etc. is wrapped in an XML wrapper and is sent to an XML data server which may be located in, for example, the computer 30. Because XML is a descriptive language, the server can process any type of data. At the server, if necessary, the data is encapsulated with to a new XML wrapper, i.e., this data is mapped from one XML schema to one or more other XML schemas which are created for each of the receiving applications. Thus, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of the system described herein. In this manner, data may be sent from any one application to one or more other applications.

Generally speaking, the computer 30 (which may be a server) stores and executes a notification distribution application 50 that collects data and other information generated by, for example, the process control systems 12 and 14, the maintenance systems 18, 22 and 26 and the business systems 35 and 36 as well as information generated by data analysis tools executed in each of these systems and distributes this information to operators, organizations, applications computers, etc. The notification distribution application 50 may include an expert engine 51 that may be based on, for example, based on the OZ expert system currently provided by NEXUS, or any other type of expert system including, for example, any type of data mining system.

The notification distribution application 50 may distribute notifications generated by or related to process entities in the process plant 10 such as processes, field devices, rotating equipment, etc. For example, the process control systems 12 or 14 may generate process alerts. Also, field devices 15 and 16 may generate alarms or alerts. The notification distribution application 50 receives such notifications and routes them to the appropriate personnel, organizations, computers, applications, user interfaces, etc. Although, in FIG. 1, the notification distribution application 50 is depicted as being implemented by the computer 30, it may be implemented by other computer systems such as computers 12A, 14A, 18, 22, 26, 35, 36, etc. Additionally, the notification distribution application 50 may be a distributed application implemented by multiple computers.

The process plant 10 may also include one or more wireless access points 72. The wireless access points may provide mobile devices 75 with a communication link to the LAN 37, the network 32, etc. The mobile devices 75 may include a lap top computer, a tablet personal computer (PC), a personal digital assistant (PDA), a cellular phone, a pager, etc. An operator may receive information regarding the process plant 10 via a mobile device 75. For example, an operator may receive a process alert via a PDA.

The process plant 10 may further include an internet gateway 82 that communicatively couples the process plant 10 to the Internet. In particular, the internet gateway 82 may be coupled to the network 32, the LAN 37, the WAN 38, etc. In one embodiment, information related to the process plant 10 may be sent to persons, organizations, computers, etc. via the internet gateway 82 and the Internet.

Figure 2:
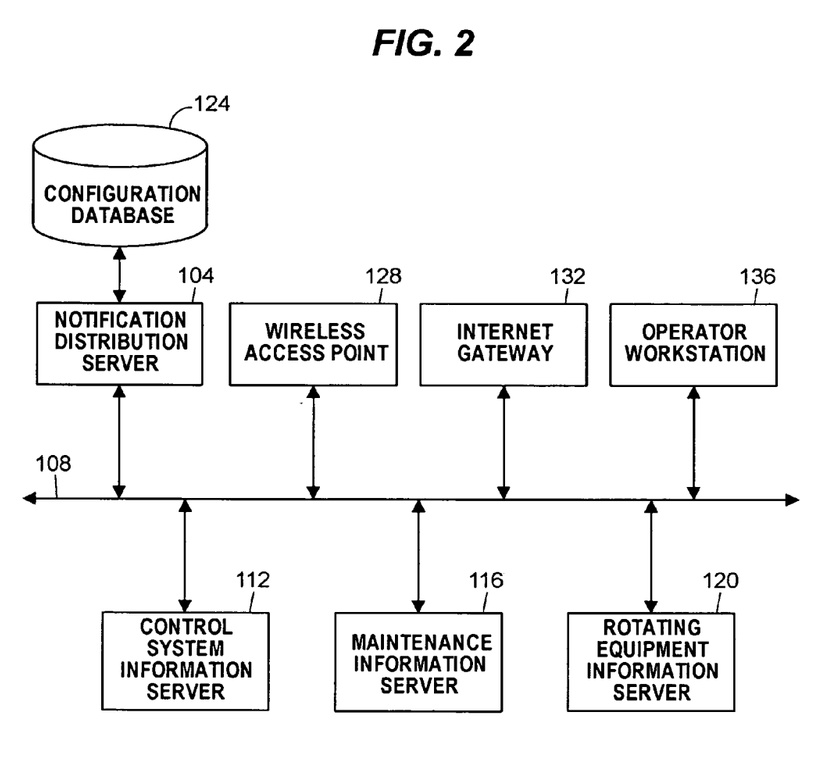
FIG. 2 is a block diagram of a data network associated with the process plant of FIG. 1.

FIG. 2 is a block diagram of data systems within a process plant. A notification distribution server 104 is communicatively coupled to one or more information servers via a network 108. For example, the notification distribution server 104 may be communicatively coupled to a control system information server 112, a maintenance information server 116, and a rotating equipment information server 120. The network 108 may be any desired communication network such as a web network.

The notification distribution server 104 may also be coupled to a configuration database 124. Additionally, one or more wireless access points 128 may also be communicatively coupled to the notification distribution server 104 via the network 108. Further, an internet gateway 132 may be communicatively coupled to the notification distribution server 104 via the network 108. Also, one or more operator workstations 136 may be communicatively coupled to the notification distribution server 104 via the network 108.

In operation, the notification distribution server 104 may receive notifications related to process entities in a process plant from one or more data servers. For example, the notification distribution server 104 may receive from the maintenance application server 116 a device alert related to a field device. As another example, the notification distribution server 104 may receive from the control system information server 112 a process alert related to a process.

In operation, the data servers (e.g., control system information server 112, maintenance information server 116, rotating equipment information server 120, etc.) may each receive notifications from a corresponding group of process entities. For example, the control system information server 112 may receive notifications such as process alerts and alarms from process control software modules, controllers, etc. Also, the maintenance information server 116 may receive notifications such as device alerts and alarms from field devices, hardware devices, etc. Further, the rotating equipment information server 120 may receive notifications such as alerts, alarms, severity values, etc., from equipment that monitors rotating equipment.

The data servers may receive notifications generated by the process entities, from equipment that monitors the process entities, etc., directly or indirectly. For example, the notifications may be received via a network, bus, one or more intermediary computers, etc. Further, the notifications may be received from a storage device (e.g., a floppy disk, compact disk read only memory (CD-ROM), a digital versatile disk (DVD), PC-Card, smart card, etc.), or downloaded from a portable device (e.g., a lap top computer, a tablet PC, a PDA, a cellular phone, etc.) via a wired or wireless link.

The data servers may then provide the notifications to the notification distribution server 104. The notifications may be provided to the notification distribution server 104, for example, when received by the data server, periodically, in response to a request from the notification distribution server 104, etc. Additionally, a data server may be may be coupled with a corresponding notification database (not shown in FIG. 2) that stores notifications from its corresponding group of process entities. In response to a request from the notification distribution server 104, the data server may search, query, etc. the notification database for notifications, and then send such notifications to the notification distribution server 104. As another example, the data server may periodically, for example, search, query, etc. the notification database for notifications, and then send such notifications to the notification distribution server 104. In embodiments that do not include a notification database, the data server may send a notification to the notification distribution server 104 when the notification is received by the data server.

Upon receiving a notification, the notification distribution server 104 may determine where the notification should be routed according to information stored in the configuration database 124. Then, the notification distribution server 104 may route the notification, for example, to an operator workstation 136, an operator's email account, a mobile device via a wireless access point (WAP) 128, to a device, email account, etc., via the internet gateway 132 and the Internet, etc.

Each of servers 104, 112, 116, and 120, as well as the wireless access point 128, and the internet gateway 132 may be implemented by one or more computers. Additionally, one computer may implement two or more, or portions of two or more, of the servers 104, 112, 116, 120, the wireless access point 128, and the internet gateway 132. Referring to FIG. 1, as merely one specific example, the notification distribution server 104, the control system information server 112, the maintenance information server 116, the rotating equipment information server 120, the wireless access point 128, and the internet gateway 132 may be implemented by computers 30, 14A, 18, 22, wireless access point 72, and internet gateway 82, respectively.

Notification Distribution Server

Figure 3:
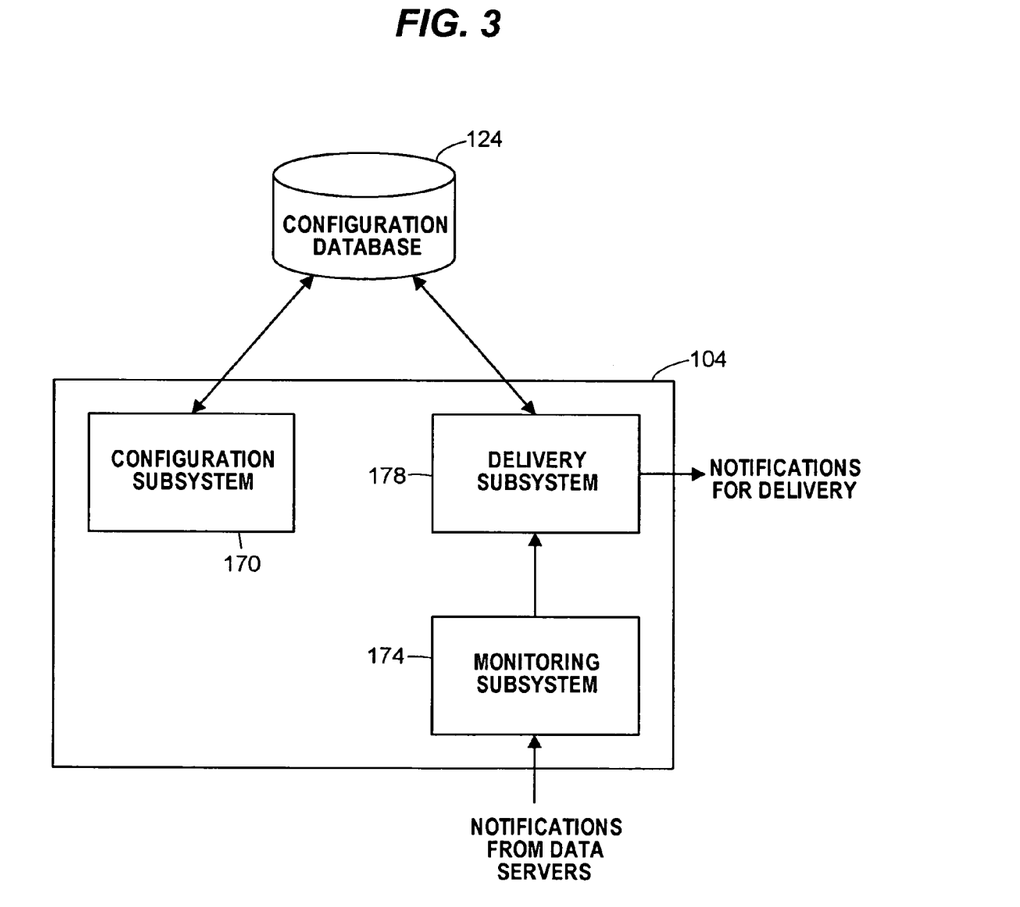
FIG. 3 is a functional block diagram of an example notification distribution server.

FIG. 3 is a functional block diagram of one example of the notification distribution server 104. The notification distribution server 104 comprises several subsystems including a configuration subsystem 170, a monitoring subsystem 174, and a delivery subsystem 178. These subsystems may be implemented using software, hardware, firmware, etc., and may be implemented by any processor associated with the process control system 10. Thus, the elements described herein may be implemented in a standard multi-purpose central processing unit (CPU) or on specifically designed hardware or firmware such as an application-specific integrated circuit (ASIC) or other hard-wired device as desired. When implemented in software, the software routine may be stored in any computer readable memory such as on a magnetic disk, a laser disk (such as a DVD) or other storage medium, in a random-access memory (RAM) or read-only memory (ROM) of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

In general, the configuration subsystem 170 allows delivery of notifications to be configured. Various aspects of the delivery may be configured such as to whom a notification should be delivered, via which mode of delivery (e.g., displayed on a workstation, sent in an email, sent in a text message via a pager or cellular phone, etc.). For example, the delivery of device alerts and alarms generated by a certain subset of field devices may be configured such that one particular person receives these notifications. As a further example, the delivery of these device alerts and alarms may be configured such that a first person receives the notifications received during a first time period during the day, and a second person receives the notifications received during a second time period during the day. As yet a further example, the delivery of these device alerts and alarms may be configured such that particular operator receives certain device alerts and/or alarms via a pager. The configuration subsystem 170 may store information related to the configurations in the configuration database 124.

Because delivery of notifications may be configured, it may be possible to lower the number of notifications that one or more persons receive. Because a person may receive a lower number of notifications, that person may be able to respond to those notifications in a more optimal manner, as opposed to if they received a large number of notifications.

In general, the monitoring subsystem 174 may receive notifications from data servers, such as the control system information server 112, the maintenance information server 116, and the rotating equipment information server 120 of FIG. 2. In another embodiment, the monitoring subsystem 174 may search or query one or more databases in which a notification may have been stored by another system, such as a process control system, a maintenance system, etc. The monitoring subsystem 174 may, for example, periodically pole the data servers to determine if any new notifications have been generated. If new notifications have been generated, the monitoring subsystem 174 may request that they be transmitted, or the data servers may automatically, transmit these notifications, to the notification distribution server 104. As another example, the monitoring subsystem 174 may periodically search or query one or more databases to determine is any newly generated notifications have been stored in the databases, and, if yes, the monitoring subsystem 174 may retrieve these notifications from the databases.

The monitoring subsystem 174 may forward received notifications to the delivery subsystem 178. In general, the delivery subsystem 178 delivers the notifications according to the configuration information in the configuration database 124. Referring to FIG. 2, the delivery subsystem 178 may, for example, forward some notifications to a wireless access point 128 for wireless delivery to a particular operator's PDA. As another example, the delivery subsystem 178 may deliver other notifications to the internet gateway 132 for delivery to an email account via the Internet.

Configuration

In general, the configuration subsystem 170 may permit a user to configure how specific notifications or groups of notifications should be delivered. The configuration subsystem 170 may include a user interface (e.g., a graphical user interface) for specifying various aspects of the delivery such as to whom notifications should be delivered and by what mode of delivery.

The user interface may permit a user to select one or more specific notification and/or one or more groups of notifications for configuring their delivery. A group of notifications may include notifications generated by a particular process entity or group of process entities. A group of process entities may characterized by a type of process entity (e.g., process control software modules, field devices, rotating equipment, power generation/distribution equipment, diagnostics, mathematical/software models, etc.) process entities within a particular area of a process plant, process entities made by a particular manufacturer, etc.

A group of notifications may also be characterized by particular types of notifications. Types of notifications may include process notifications, device notifications, maintenance notifications, etc. Types of notifications may also include notifications indicative of a particular level of seriousness such as notifications having an associated priority level that falls within a particular range, notifications having an associated health index value that falls within a particular range, failure alarms, maintenance alarms, advisory alarms, a particular HART device status condition, etc.

Additionally, a group of notifications may be specified by two or more of the above-described, or similar, characteristics. For example, a group of notifications may include notifications generated by field devices within a particular area of the process plant. As another example, a group of notifications may include notifications of a particular seriousness generated by all process entities within a particular area of the process plant. One of ordinary skill in the art will recognize that a group of notifications may be specified by many other combinations of the above-described characteristics, as well as other characteristics.

Additionally, the user interface of the configuration subsystem 170 may permit configuring delivery modes of one or more notifications. For instance, the user interface may permit specifying to whom a notification or group of notifications should be delivered. For example, a user may specify a person, a group of persons, an account (e.g., a login account, an email account, etc.), an email address, etc. Further, the user interface may permit scheduling delivery according to a time period in which the notification is received by the notification distribution server 104. For example, the user interface may permit delivery of one or more notifications to be configured such that the notifications are delivered to a first operator when received during a first time period, but delivered to a second operator when received during a second time period.

Additionally, the user interface of the configuration subsystem 170 may permit specifying one or more delivery modes. For example, a user may specify that notifications delivered to a certain operator should be delivered to the operator's PDA. Specifying a delivery mode may include indicating the type of device to which the notification is to be delivered (e.g., workstation, PDA, cellular phone, pager, etc.). Specifying a delivery mode may also include indicating an identifier of a device to which the notification should be delivered (e.g., a network address, IP address, cellular phone number, pager number, etc.). Specifying a delivery mode may additionally include indicating a network via which the notification should be delivered (e.g., the LAN 37 (FIG. 1), the WAN 38 (FIG. 1), a wireless LAN, the Internet, etc.). Specifying a delivery mode may additionally include indicating an identifier of the person or persons to which the notification should be delivered (e.g., a login identifier (ID), an employee ID number, an email address, an organizational ID, an email group, a distribution list ID, etc.).

The user interface of the configuration subsystem 170 may be coupled to receive information related to delivery modes available to particular persons. This information may be stored in a database such as the configuration database 124 or another database. This information may include various delivery modes available to particular persons. For example, this information may include information that indicates a particular person may receive notifications via a particular workstation and a PDA. Additionally, this information may further include any information that may be necessary to deliver a notification to these various modes of delivery. For instance, an IP address or email account associated with the PDA may be specified. If a cellular phone or pager were available to a user, the phone numbers associated with these devices could be specified. Similarly, a particular network ID, and IP address of an email proxy server, email protocol, etc., may also be included. Further, this information may include information that specifies when a particular delivery could or should be used to send a notification to a particular person. For example, a notification received when the person is typically not on the plant premises should be sent to the person's pager.

The user interface of the configuration subsystem 170 may permit a user to specify this information for particular persons. Alternatively or additionally, another system may be used to permit a user to specify this information.

Once the delivery of one or more notifications has been configured, the configuration subsystem 170 may store the configuration information in the configuration database 124.

Figure 4:
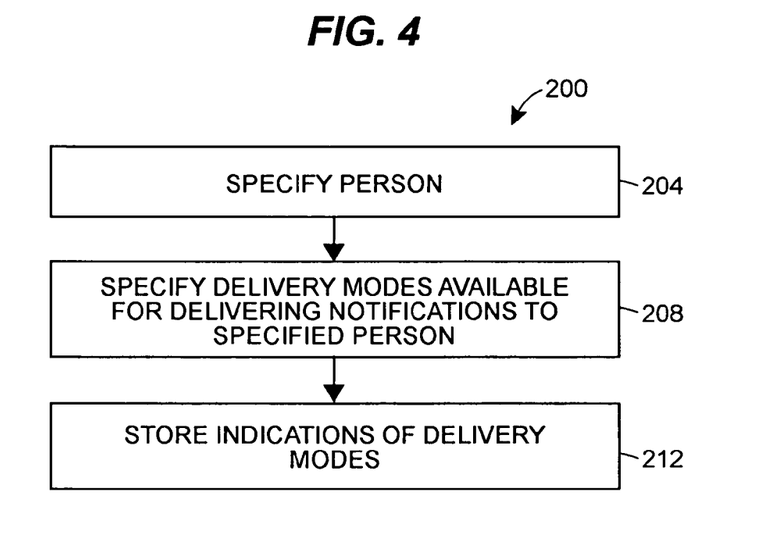
FIG. 4 is a flow diagram of an example method that may be used to configure delivery modes available to persons associated with a process plant.

FIG. 4 is a flow diagram of an example method 200 that may be used to configure delivery modes available to persons associated with a process plant. The method 200 will be described with reference to FIG. 3. The method 200 may be implemented by the configuration subsystem 170 or by some other system.

At block 204, a user may specify a person for which delivery modes are to be configured. Specifying a person may include specifying a single person, specifying several persons, or specifying a group of persons. As one example, a user interface may prompt the user to select one or more persons, or one or more groups of persons, from a list using a mouse, keypad, stylus, etc. As another example, the user may be prompted to type in a person's name, ID number, login ID, etc.

At block 208, a user may specify delivery modes available to the person selected at block 204. For example, a user interface may prompt the user via one or more forms to type in, select from a list, etc. various delivery modes that are to be available to the selected person. For example, the user may be prompted to specify whether the person may receive notifications at a particular workstation, via email, PDA, cellular phone, pager, etc. Additionally, the user may be prompted to enter information necessary for sending information via the various delivery modes such as a network ID, IP address, email account, email address, email protocol, phone number, network ID of a proxy server, IP address of a proxy server, etc.

At block 212, the delivery mode information specified at block 208 is stored. This information may be stored in a memory, such as the configuration database 124, another database, etc.

Figure 5:
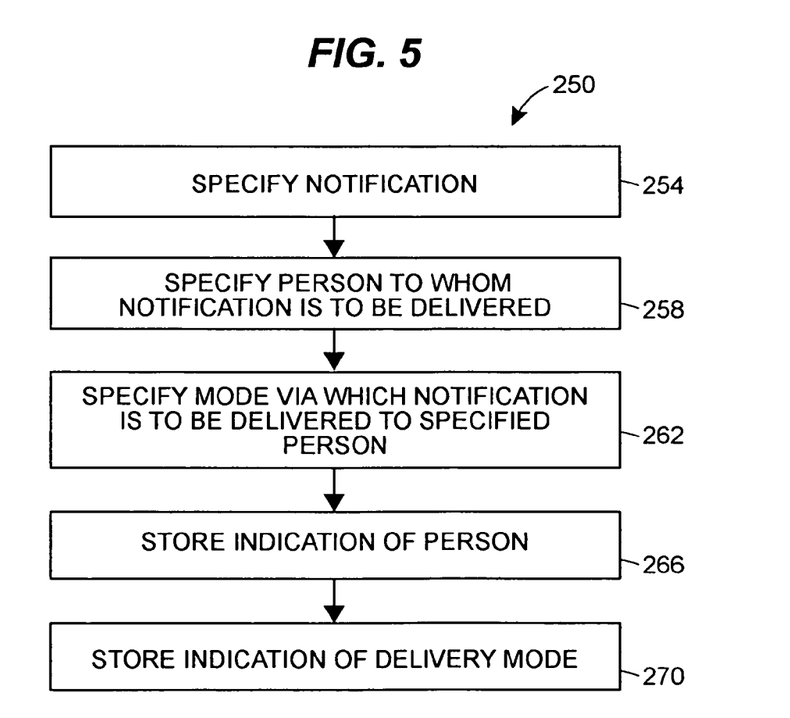
FIG. 5 is a flow diagram of an example method that may be used to specify how to deliver a notification.

FIG. 5 is a flow diagram of an example method 250 that may be used to specify how to deliver a notification. The method 250 will be described with reference to FIG. 3. The method 250 may be implemented by the configuration subsystem 170 or by some other system.

At block 254, a user may specify a notification for which delivery is to be configured. Specifying a notification may include specifying a particular notification, specifying several notifications, or specifying a group of notifications. As one example, a user interface may prompt the user to select one or more notifications from a list using a mouse, keypad, stylus, etc. The list may include all possible notifications in the process plant or some subset of the possible notifications in the process plant. Additionally, the list may include all possible notifications associated with some subset of process entities in the process plant or some subset of the possible notifications associated with the subset of process entities. For instance, the user may be permitted, via the user interface, to select a subset of process entities (e.g., process control software modules, field devices, process entities from a particular area of the plant, etc.) and/or a subset of notifications (e.g., alarms, notifications having a certain range of priorities, etc.).

Additionally, the user interface may permit the user to select one or more groups of notifications from a list using a mouse, keypad, stylus, etc. For instance, a user may be able to select all notifications, or some subset of notifications, associated with process entities, or some subset of process entities in the process plant.

At block 258, the user may specify one or more persons to whom the notification or notifications specified at block 254 are to be delivered. For example, the user interface may provide a list of persons, and the user may be prompted to select one or more persons from the list. The list may additionally or alternatively include groups of persons. As another example, the user interface may prompt the user to type in a person's name, ID number, login ID, etc.

At block 262, the user may specify a mode or modes of delivery for delivering the notification or notifications specified at block 254 to the person or persons specified at block 258. As one example, the user may specify a mode or modes of delivery for each person specified at block 258.

If information related to the different modes of delivery available to the person has already been obtained and stored (e.g., using a method such as the method 200 of FIG. 4), this information may be referenced. For example, the user interface may present the different modes of delivery to the user and prompt the user to select one or more of these modes of delivery. If information related to the different modes of delivery available to the person has not already been obtained and stored, a method such as the method 200 of FIG. 4 may be invoked to obtain and store this information. Alternatively, the user interface may merely prompt the user to enter information (e.g., an account ID, an email address, email protocol, proxy server ID, phone number, etc.) related to the desired mode or modes for delivering the notification or notifications specified at block 254.

At block 266, an indication or indications of the person or persons selected at block 258 may be stored. Similarly, at block 270, and indication or indications of the delivery mode or modes selected at block 266 may be stored. The information may be stored, for example, in the configuration database 124 so that it is associated with the notification or notifications specified at block 254. For instance, the delivery subsystem 178 should, upon receiving a notification, be able, for example, to retrieve delivery mode information associated with the received notification from the configuration database 124.

Monitoring and Delivering Notifications

Referring again to FIG. 3, the monitoring subsystem 174, as described above, receives notifications from one or more data servers and/or databases. The monitoring subsystem 174 may request the notifications from data servers, receive notifications from a data server without prompting, and/or search or query databases for notifications. If the monitoring subsystem 174 requests the notifications, or searches or queries databases for notifications, the monitoring subsystem 174 may do so periodically or based upon some triggering event. For example, data server may indicate to the monitoring subsystem 174 that a number of notifications have been received by the data server. Upon receiving one or more notifications, the monitoring subsystem may provide the notifications to the delivery subsystem 178.

As described above, the delivery subsystem 178 generally delivers the notifications according to the configuration information in the configuration database 124. For example, the delivery subsystem 178 may, upon receiving a notification, search, query, etc. the configuration database 124 for information related to how that notification is to be delivered. The delivery subsystem 178 may retrieve delivery mode information from the configuration database 124 differently depending upon how the information is organized.

For example, the delivery subsystem 178 may retrieve information that indicates the person or persons who should receive the notification, as well information regarding the particular delivery mode or modes to be used. Alternatively, the delivery subsystem 178 may retrieve information that indicates the particular delivery mode or modes to be used for delivering the notification, but does not directly indicate the person or persons who should receive the notification. For instance, the retrieved information may indicate an IP address, a pager number, etc., of the device to which the notification should be sent, but does not otherwise indicate the person that should receive the notification.

Based on the information retrieved from the configuration database 124, the delivery subsystem 178 determines the delivery mode or modes for sending the notification. Then, the delivery subsystem 178 delivers the notification according to the determined delivery mode or modes. Referring now to FIG. 2, if, for example, the delivery subsystem 178 determines that the notification is to be delivered to a particular workstation 136 in the process plant, the delivery subsystem 178 may send that notification to the workstation 136 via the network 108. As another example, if the delivery subsystem 178 determines that the notification is to be delivered to a wireless device in the process plant, the delivery subsystem 178 may send that notification to a WAP 128 via the network 108. The WAP 128 may then wirelessly transmit the notification to the wireless device. As yet another example, if the delivery subsystem 178 determines that the notification is to be delivered to a pager, the delivery subsystem 178 may send that notification to a paging service server via the internet gateway 132 and the Internet.

Figure 6:
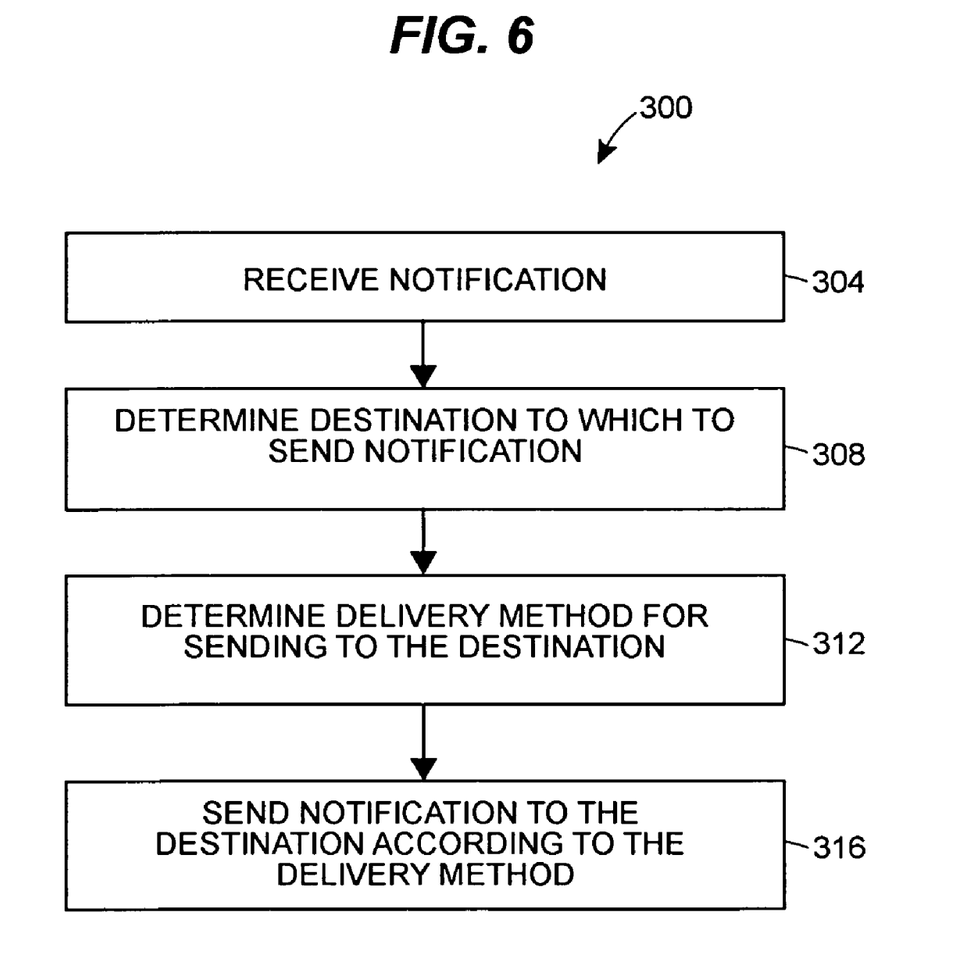
FIG. 6 is a flow diagram of an example method that may be used to deliver a notification.

FIG. 6 is a flow diagram of an example method 300 that may be used to deliver a notification. The method 300 will be described with reference to FIGS. 2 and 3. The method 300 may be implemented by the delivery subsystem 174 or by some other system.

At block 304, a notification is received. For example, the delivery subsystem 178 may receive the notification from the monitoring subsystem 174, from a data server, etc.

At block 308, at least one destination to which to send the notification is determined. For example, the delivery subsystem 178 may search or query the configuration database 124 for information that indicates at least one destination to which to send the notification. This information may include, for example, a person's name, an account name, an account ID, a network ID, an IP address, an email address, a cellular phone number, a pager number, etc.

At block 312, a delivery method for sending the notification to the destination is determined. For example, the delivery subsystem 178 may search or query the configuration database 124 for information that indicates a delivery method or methods for sending the notification to the destination or destinations. The search or query may be the same search/query described with reference to block 308, or a separate search/query. The information that indicates a delivery method for sending to the destination may include an indication of whether the destination is a person, an account, a network ID, an IP address, an email address, a cellular phone number, a pager number, etc. The information may also include data that may permit the delivery subsystem 178 to appropriately format the notification for the particular delivery method (e.g., a network protocol, email protocol, proxy server, paging service server, etc.).

At block 316, the notification is sent to the destination or destinations according to the appropriate delivery method or method. For example, the delivery subsystem 178 may appropriately format the notification and then send the notification to its destination via the network 108.

The methods of FIGS. 4–6 may be implemented using software, hardware, firmware, etc., and may be implemented by any processor associated with the process control system 10. Thus, the methods of FIGS. 4–6 may be implemented in a standard multi-purpose CPU or on specifically designed hardware or firmware such as an ASIC or other hard-wired device as desired. When implemented in software, the software routine may be stored in any computer readable memory such as on a magnetic disk, a laser disk (such as a DVD) or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method for configuring delivery of notifications related to process plants, the method comprising:
   selecting at least one person to receive a notification from a process entity in an industrial process plant, the process entity operating in conjunction with other process entities to facilitate an industrial process;
   selecting a delivery method for delivering the notification to the at least one person; and
   storing an indication of the selected person and an indication of the selected delivery method in a memory.

2. A method as defined in claim 1, further comprising:
   selecting a time period within which, if the notification is received, the at least one person is to receive the notification;

storing an indication of the selected time period in the memory.

3. A method as defined in claim 2, wherein selecting at least one person includes selecting a first person and selecting a second person;
wherein selecting the time period comprises:
selecting a first time period within which, if the notification is received, the first person is to receive the notification;
selecting a second time period within which, if the notification is received, the second person is to receive the notification; and
wherein storing the indication of the selected time period comprises storing an indication of the selected first time period and an indication of the selected second time period in the memory.

4. A method as defined in claim 1, wherein selecting at least one person to receive the notification comprises selecting a group of persons.

5. A method as defined in claim 1, further comprising selecting the notification.

6. A method as defined in claim 1, wherein selecting the notification comprises selecting a group of notifications.

7. A method as defined in claim 6, wherein selecting at least one person to receive the notification comprises selecting the at least one person to receive the group of notifications.

8. A method as defined in claim 6, wherein the group of notifications comprises notifications related to a group of process entities in the process plant.

9. A method as defined in claim 6, wherein the group of notifications comprises notifications of at least one notification type.

10. A method as defined in claim 6, wherein the group of notifications comprises notifications having an associated priority level within a range of priority levels.

11. A method as defined in claim 6, wherein the group of notifications comprises notifications having an associated health index within a range of health index values.

12. A method as defined in claim 1, wherein the notification comprises at least one of a process alarm, a device alert, a device alarm, a notification related to rotating equipment, and a notification related to power generation and distribution equipment.

13. A method as defined in claim 1, wherein the memory comprises a database.

14. A tangible medium storing machine readable instructions, comprising:
first code for selecting at least one person to receive a notification from a process entity in an industrial process plant, the process entity operating in conjunction with other process entities to facilitate an industrial process;
second code for selecting a delivery method for delivering the notification to the at least one person; and
third code for storing an indication of the selected person and an indication of the selected delivery method in a memory.

15. A method for delivering notifications related to process plants, the method comprising:
receiving a notification associated with a process entity in an industrial process plant, the process entity operating in conjunction with other process entities to facilitate an industrial process;
determining at least one destination to which to send the notification based on configuration information associated with the notification;
determining a delivery method for sending the notification to the destination based on the configuration information; and
sending the notification to the destination according to the delivery method.

16. A method as defined in claim 15, wherein the at least one destination comprises one of a person, a network address, a network identifier (ID), an internet protocol (IP) address, an account, an email address, a cellular phone number, and a pager number.

17. A method as defined in claim 15, wherein the determined delivery method is according to a network communication protocol.

18. A method as defined in claim 15, wherein the determined delivery method is according to an e-mail protocol.

19. A method as defined in claim 15, wherein the determined delivery method comprises using a wireless local area network.

20. A method as defined in claim 15, wherein the determined delivery method comprises using a cellular network.

21. A method as defined in claim 15, wherein the determined delivery method comprises using a paging network.

22. A tangible medium storing machine readable instructions, comprising:
first code for receiving a notification associated with a process entity in an industrial process plant, the process entity operating in conjunction with other process entities to facilitate an industrial process;
second code for determining at least one destination to which to send the notification based on configuration information associated with the notification;
third code for determining a delivery method for sending the notification to the destination based on the configuration information; and
fourth code for sending the notification to the destination according to the delivery method.

* * * * *

UNITED STATES PATENT AND TRADEMARK OFFICE
CERTIFICATE OF CORRECTION

PATENT NO. : 7,103,427 B2
APPLICATION NO. : 10/376550
DATED : September 5, 2006
INVENTOR(S) : Steven R. Dillon Page 1 of 1

It is certified that error appears in the above-identified patent and that said Letters Patent is hereby corrected as shown below:

On the title Page:

At field (73), "Fisher-Rosemont" should be -- Fisher-Rosemount --.

At Column 5, line 49, "van" should be -- via --.

At Column 9, line 49, "determine is" should be -- determine if --.

At Column 12, line 59, "and indication" should be -- an indication --.

At Column 14, lines 22-23, "method or method" should be -- method or methods --.

Signed and Sealed this

Fourteenth Day of August, 2007

JON W. DUDAS
*Director of the United States Patent and Trademark Office*